United States Patent [19]

Fletcher et al.

[11] Patent Number: 4,923,004
[45] Date of Patent: May 8, 1990

[54] COMFORT HEAT EXCHANGER

[75] Inventors: Eldon L. Fletcher, Kingston; Tiong Hap (Hans) Kho, Chatham, both of Canada

[73] Assignee: Du Pont Canada, Inc., Mississauga, Canada

[21] Appl. No.: 193,546

[22] Filed: May 12, 1988

[30] Foreign Application Priority Data

May 14, 1987 [GB] United Kingdom ............... 87.11428

[51] Int. Cl.$^5$ ............................ F28F 9/02; F28F 9/16; F28F 9/22
[52] U.S. Cl. ..................... 165/175; 165/905
[58] Field of Search ............... 165/173, 174, 175, 144, 165/145, 903, 905

[56] References Cited

U.S. PATENT DOCUMENTS

| | | | |
|---|---|---|---|
| 1,235,057 | 7/1917 | Roberson | 165/175 X |
| 2,573,161 | 10/1951 | Tadewald | 165/175 |
| 3,368,617 | 2/1968 | Rosmane et al. | 165/175 |
| 3,417,812 | 12/1968 | Smith | 161/1 |
| 3,438,434 | 4/1969 | Smith | 165/158 |
| 3,537,935 | 11/1970 | Withers . | |
| 3,719,737 | 3/1973 | Vaillancourt et al. . | |
| 4,030,541 | 6/1977 | Gross et al. | 165/905 |
| 4,190,101 | 2/1980 | Hartmann | 165/905 X |
| 4,304,743 | 12/1981 | Paradis . | |
| 4,415,020 | 11/1983 | Daugirda | 165/146 X |
| 4,735,261 | 4/1988 | Huebner | 165/173 |
| 4,768,586 | 9/1988 | Berneburg et al. | 165/905 X |

FOREIGN PATENT DOCUMENTS

| | | |
|---|---|---|
| 0181614 | 5/1986 | European Pat. Off. . |
| 0191956 | 8/1986 | European Pat. Off. . |
| 384116 | 10/1923 | Fed. Rep. of Germany ...... 165/175 |
| 1161004 | 1/1964 | Fed. Rep. of Germany . |
| 58-178194 | 10/1983 | Japan . |
| 1162612 | 8/1969 | United Kingdom . |
| 2052366 | 1/1981 | United Kingdom . |
| 2052367 | 1/1981 | United Kingdom . |

*Primary Examiner*—Carl D. Price

[57] ABSTRACT

A heat exchanger, especially a heat exchanger in the form of a comfort heat exchanger, is disclosed. The heat exchanger is comprised of two manifold elements adapted to receive and discharge fluid, and a plurality of tube units transversely located between the manifolds, each tube unit being integrally connected to substantially rigid end elements that fit into the manifolds. The tubes are preferably oriented and expanded to about their original diameter. The heat exchanger is intended to be fabricated from polymer, especially polyamide compositions. The tube units are intended to be manufactured using injection moulding techniques, and then subjected to orientation and expansion steps. Parts fabricated during manufacture of the heat exchangers are also disclosed. The heat exchangers are particularly intended for use as comfort heat exchangers in automobiles.

18 Claims, 4 Drawing Sheets

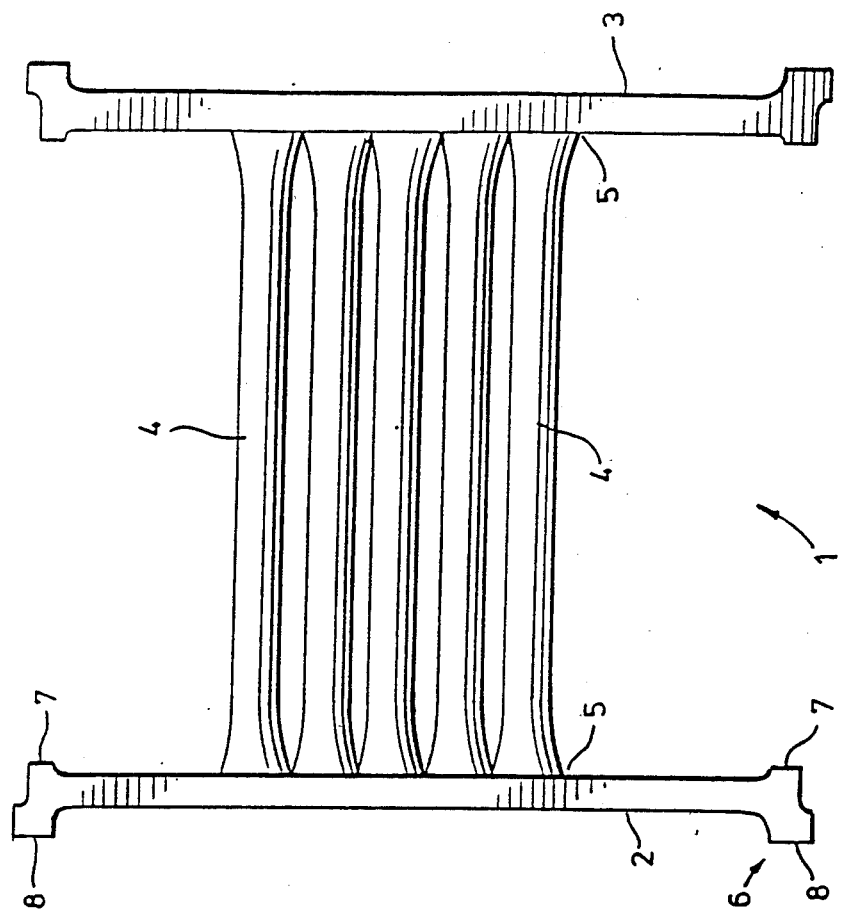
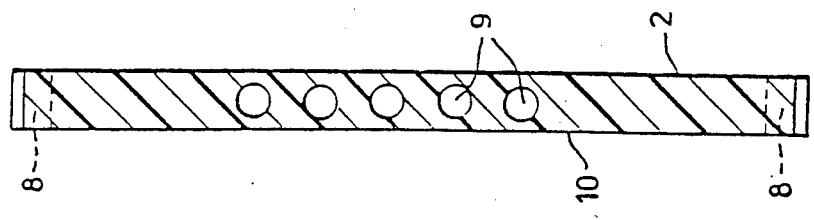
FIG. 1
FIG. 2

4,923,004

COMFORT HEAT EXCHANGER

BACKGROUND OF THE INVENTION

FIELD OF THE INVENTION

The present invention relates to heat exchangers, especially to so-called comfort heat exchangers, and in particular to comfort heat exchangers of the type used in the heating and air conditioning systems of automobiles.

Heat exchangers are used in a wide variety of end-uses. In some instances, the heat exchangers are large and the weight of the exchanger is only of minor importance. However, in other instances the size and weight of the heat exchanger is a significant factor. An example of the latter is in the automobile industry where there are strict and demanding operating requirements that the exchanger must meet but where both the size and weight of the exchanger are important, especially as the automobile manufacturing companies continue to seek to improve fuel efficiency by reducing the weight of automobiles.

One of the means to reduce the weight of heat exchangers is to fabricate the exchanger from polymeric material instead of from metal. However, in general, it is not possible to merely substitute polymer for metal. Fabrication techniques that have proven to be quite acceptable using metals tend to be inapplicable to polymers. Moreover, performance requirements tend to mean that many polymers may not be suitable for use in the form of heat exchangers.

With respect to automobiles, there are five types of heat exchangers that may be used viz. the engine coolant heat exchanger (which is usually referred to as the radiator), air conditioning radiator, oil cooling system, air intake after-cooler or intercooler for turbo-charged air intake systems and the system used to heat and/or air condition the vehicle i.e. the so-called comfort heat exchanger. Each system has different performance requirements, including with respect to heat and pressure and with respect to the type of fluid to be passed through or around the heat exchanger.

A heat exchanger, and parts thereof, fabricated from a thermoplastic polymer and of a type suitable for use as a comfort heat exchanger in an automobile or other vehicle has now been found.

SUMMARY OF THE INVENTION

Accordingly, the present invention provides an article manufactured from a thermoplastic polymer, said article essentially comprising a plurality of transverse parallel hollow tubes integrally connected at each end to a substantially rigid end element, each of said end elements having planar sides and opposing faces, the tubes being integrally connected to one face of each end element, each of said tubes being radiused at the integral junction of tube and end element, said end elements having orifices therein extending between said opposite faces and being in fluid flow communication with said hollow tubes, said orifices and the inside of said hollow tubes being of uniform cross-section and the walls of said tubes between the flared junctions being of uniform thickness.

The present invention also provides a device manufactured from a thermoplastic polymer, said device essentially comprising a plurality of transverse parallel hollow tubes integrally connected at each end to a substantially rigid end element, each of said end elements having planar sides and opposing faces, the tubes being integrally connected to one face of each end element, each of said tubes being flared at the integral junction of tube and end element, said end elements having orifices therein extending between said opposite faces and being in fluid flow communication with said hollow tubes, and the hollow tubes having been oriented to increase the length thereof by at least two times, the walls of said tubes between the integral junctions being of substantially uniform thickness.

In a preferred embodiment of the device of the present invention, the internal diameter of the oriented tubes is at least 0.5 times that of the tubes prior to orientation.

In another embodiment, the hollow tubes have been oriented to increase the length thereof by at least two times and then expanded so that the internal diameter of said tubes is at least 0.5 times the diameter of the tubes prior to orientation.

The present invention further provides a process for the manufacture of a device from a tubular article formed from a thermoplastic polymer, said process comprising:

(i) inserting rods into the tubes of the tubular article, said article having a plurality of transverse parallel hollow tubes integrally connected at each end to a substantially rigid end element, each of said end elements having planar sides and opposing faces, the tubes being integrally connected to one face of each end element, each of said tubes being flared at the integral junction of tube and end element, said end elements having orifices therein extending between said opposite faces and being in fluid flow communication with said hollow tubes, the walls of said tubes between the integral junctions being of substantially uniform thickness, said rods having a diameter that is not greater than the internal diameter of the tubes;

(ii) placing the article containing the rods into a heated atmosphere and uniformly heating the article to a temperature above the glass transition temperature but below the melting point of the polymer:

(iii) moving one end element relative to the other end element so as to orient the tubes to a length that is at least two times the length prior to orientation;

(iv) heat setting the oriented tubes; and (v) cooling the thus oriented and heat set tubes.

In a preferred embodiment of the process of the present invention, the tubes of the tubular article in step (i) are unoriented tubes.

In another embodiment of the process, the article has been formed in an injection moulding process.

In a further embodiment of the process, the rods are heated prior to step (iii) of the process.

In addition, the present invention provides a heat exchanger comprising:

(a) two manifold elements, said manifold elements being adapted to receive and discharge a fluid, and (b) a plurality of tube units transversely located between said manifolds, each of said tube units essentially comprising a plurality of transverse parallel hollow tubes integrally connected at each end to a substantially rigid end element, each of said end elements having planar sides and opposing faces, the tubes being integrally connected to one face of each end element, each of said tubes being radiused at the integral junction of tube and end element, said end elements having orifices therein extending between said opposite faces and being in fluid flow communication with said hollow tubes, the hollow tubes having been oriented to increase the length thereof by at least two times, the walls of said tubes between the integral junctions being of substantially uniform thickness, said tube units being positioned so that the hollow tubes are in a spaced apart but juxtaposed relationship, said tubes units being sealed together so that fluid will flow from one manifold to the other manifold through the hollow tubes.

In a preferred embodiment of the heat exchanger of the present invention, the internal diameter of said tubes is at least 0.5 times the diameter of the tubes prior to orientation.

In another embodiment, the thickness of the walls of said tubes is less than 0.5 mm, and especially in the range of 0.12–0.4 mm.

In a further embodiment, the outside diameter of the tubes is in the range of 2–7 mm.

In yet another embodiment, the heat exchanger is adapted so that fluid will flow from an inlet section of a first manifold, through tubes to a second manifold, and then back through further tubes to an outlet section of the first manifold.

BRIEF DESCRIPTION OF THE DRAWINGS

The present invention relates to so-called heat exchangers and to the fabrication of such heat exchangers and will be described with particular reference to the embodiments shown in the drawings, in which:

FIG. 1 is a schematic representation of a article used in the fabrication of the tube units for the heat exchanger;

FIG. 2 is a cross-section of the article of FIG. 1 taken through end element 2;

FIG. 6 is an alternative representation to FIG. 5.

With reference to FIG. 1, article 1 is comprised of end elements 2 and 3 and hollow tubes 4. There are a plurality of hollow tubes 4 which would normally be of similar shape and size but in embodiments could be different. A plurality of hollow tubes 4 are transversely located between end element 2 and end element 3. The article, which is intended to be injection moulded and then used in the fabrication of a heat exchanger, would normally have a plurality of transverse hollow tubes e.g. at least four tubes and especially 414 10 tubes, it being understood that the actual number of hollow tubes in the article of FIG. 1 will depend in particular on the design of the heat exchanger.

Figure 3:
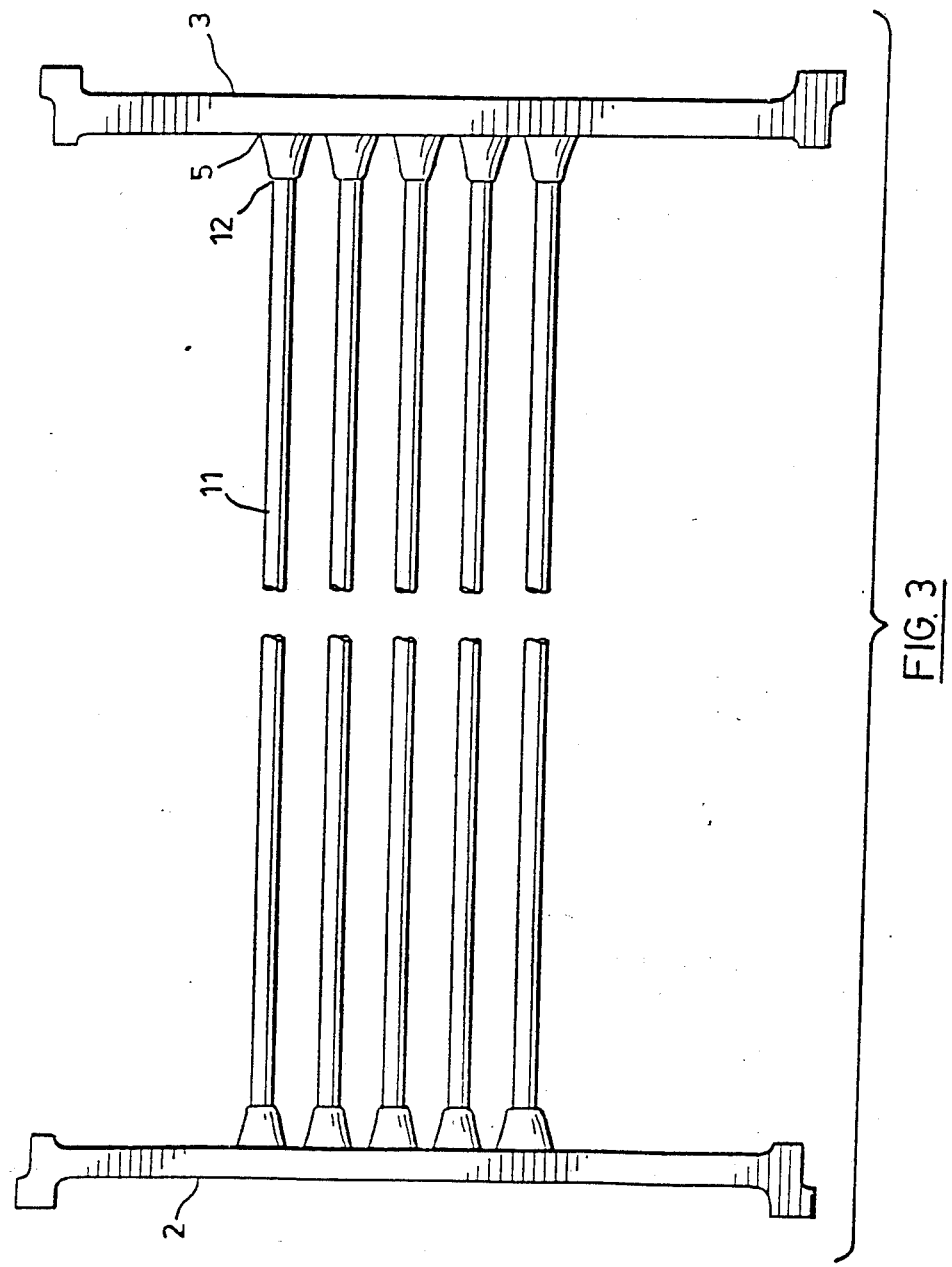
FIG. 3 is a schematic representation of the article of FIG. 1 after orientation.

Each end of each hollow tube 4 is radiused on the outside of the tube at the integral junction 5 of the hollow tube and end element. The radiusing of the integral junction between the outside of the hollow tube and the end element is the forming of the outside surface of the integral junction to approximate that of the radius of a circle, as will be appreciated by those skilled in the art. Such radiusing is important in order to provide strength to the area at which the hollow tube and end element are joined, especially after the fabrication steps described hereinafter have been performed and in the subsequent use of the heat exchanger. In embodiments of the invention, the integral junction 5 is both radiused and flared.

Hollow tubes 4 have a uniform wall thickness between the radiused elements at integral junction 5. Moreover, hollow tubes 4 are in a spaced apart relationship and are parallel to each other. It is preferred that hollow tubes 4 be linear and of uniform dimension throughout their length, apart from the radiused elements at junctions 5. Although hollow tubes 4 are spaced apart, it is preferred that the tubes be juxtaposed to each other but spaced apart in a manner that would not substantially restrict the flow of air between the tubes. The hollow tubes 4, in the embodiment shown in FIG. 1, are positioned at right angles to end elements 2 and 3.

End elements 2 and 3 extend beyond hollow tubes 4 in both directions in the embodiment shown in FIG. 1, in order to provide a means to facilitate the assembly of a heat exchanger as described herein. The extended portions of the end elements, identified as ends 6 in the drawing, are shown as having lugs 7 and 8 to facilitate such positioning of the device.

A cross-section of FIG. 1 taken through end element 2 is shown in FIG. 2. End element 2 is shown as having a plurality of orifices 9, which correspond to the hollow tubes 4 (not shown). Orifices 9 are in fluid flow communication with hollow tubes 4. Moreover, orifices 9 are aligned with the interior of hollow tubes 4 and in embodiments are of the same cross-sectional shape as hollow tubes 4. It is preferred that orifices 9 have a circular cross section.

It is also preferred that end elements 2 and 3 have an elongated shape, as shown in FIG. 2. As shown, the sides 10 are planar and parallel to each other, to facilitate assembly of a plurality of devices so that the end elements are in a column with side 10 of one end element in abutting relationship with side 10 of the end element of the adjacent device in the heat exchanger. As discussed below, it the articles after orientation of tubes, be sealed in a manner that does not permit the flow of fluid therebetween. Although the end elements shown in FIG. 2 are elongated with parallel sides, it is to be understood that other cross-elemental shapes are possible e.g. hexagonal, a primary consideration being ease of final assembly of the heat exchanger.

In an embodiment of the present invention, the distance between lugs 7 and 8 and the nearest hollow tube 4 is different on the two ends of the end element, especially by an amount that is approximately equal to half of the spacing between the axes of adjacent hollow tubes. Such an off-set nature of the hollow tubes 4 permits alternating assembly of the devices in the heat exchanger, so that the hollow tubes 4 of one device are positioned opposite the gaps between the hollow tubes 4 of the immediately adjacent device, thereby permitting maximum contact between air flowing between tubes and the surfaces of tubes.

It is intended that the article shown in FIGS. 1 and 2 be manufactured as an integral unit in an injection moulding process. Techniques for such manufacture will be understood by those skilled in the art.

FIG. 3 shows a device similar to the article of FIGS. 1 and 2 except that hollow tubes 4 are shown as oriented tubes 11. Oriented tubes 11 have a length significantly longer than hollow tubes 4, especially at least twice as long and in particular 3–5 times longer, and are formed by orientation of the hollow tubes of the article of FIGS. 1 and 2 by corresponding amounts. Oriented tubes 11 have a wall thickness and an outside diameter significantly smaller than those of hollow tubes 4, by amounts that are related to the degree of orientation and the conditions/ under which the orientation was conducted. Oriented tubes 11 are connected to the radiused portion of hollow tubes 4 at neck 12; as shown in FIG. 3, the radiused portion of hollow tubes 4 does not undergo orientation which is advantageous in the retention of the strength of the integral junction 5 between the radiused portion of the hollow tubes 4 and end elements 1 and 2.

As noted above, the device shown in FIG. 3 may be formed by orientation of the article of FIGS. 1 and 2. For instance, end elements 1 and 2 may be clamped and at least hollow tubes 4 heated to a temperature above the glass transition temperature of the polymer from which the device has been formed, to facilitate orientation of hollow tubes 4. End elements 1 and 2 are then moved further apart, thereby resulting in orientation of the hollow tubes 4 to form oriented tubes 11. Uniformity of heating of hollow tubes 4, uniformity of the thickness of the walls of the hollow tubes 4 and a smooth orientation step are all important factors in the formation of oriented tubes 11 having acceptable properties.

Figure 4:
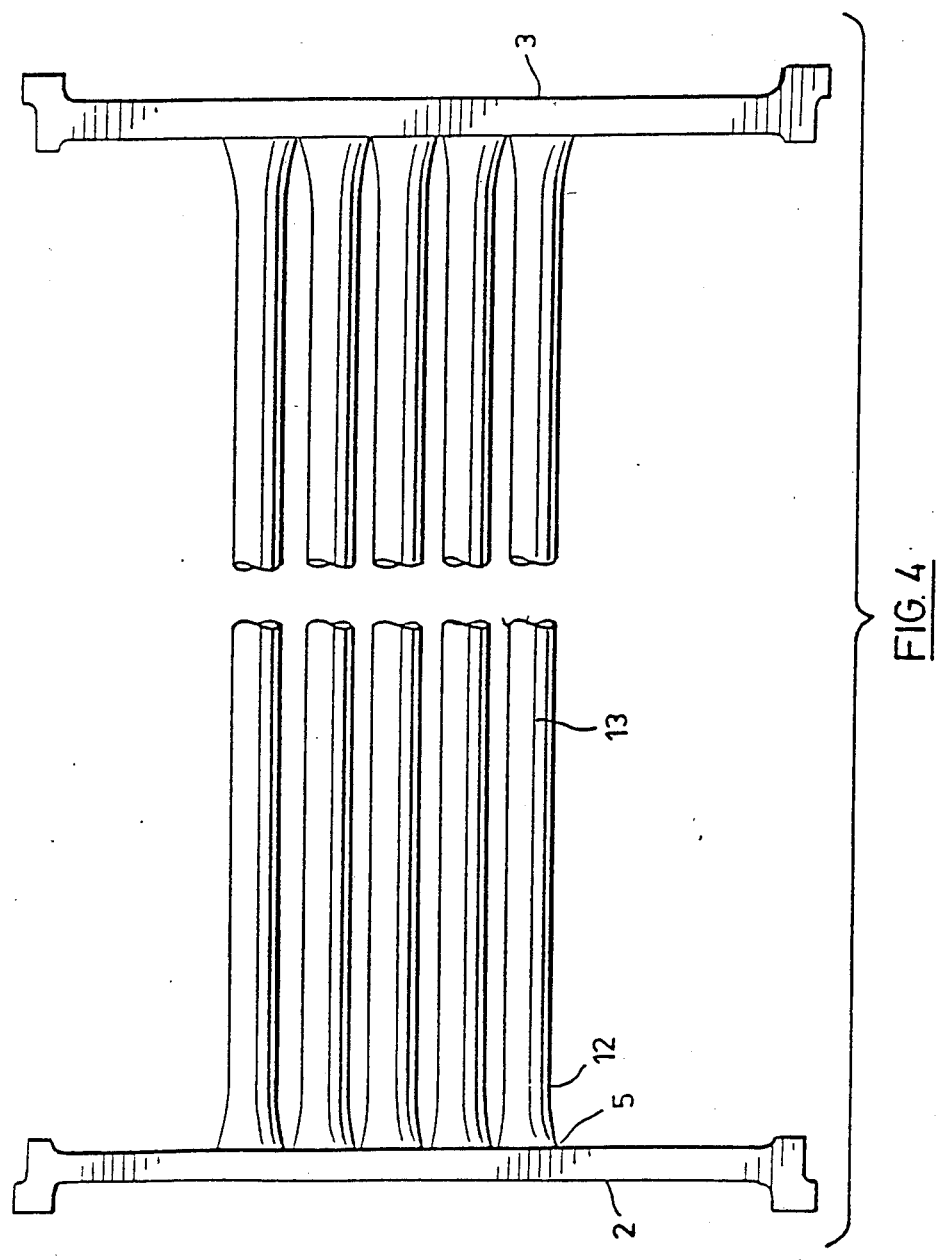
FIG. 4 is a schematic representation of the article of FIG. 1 after orientation and expansion.

FIG. 4 is similar to FIG. 3, except that the device shown is characterized by hollow tubes that have been oriented, as in FIG. 3, and then subjected to an expansion step so that the tubes, expanded tubes 13, have a diameter more closely related to that of the hollow tubes 4 shown in FIG. 1. In particular, expanded tubes 13 have a diameter that is at least 0.5 times and especially 0.5-1.5 times that of the hollow tubes 4 of FIG. 1. The device of FIG. 4 is formed from the device of FIG. 3 by applying pressure, e.g. of a gas or liquid to the inside of oriented tubes 12 or by means of a tapered rod or the like inserted into orifices 9, under conditions that result in expansion of oriented tubes 11. Such conditions will include heating the tubes above the glass transition temperature of the polymer but below the temperature at which creep of the polymer or other effects occur that result in the loss of the degree of orientation of the polymer, as well as the application of sufficient pressure under controlled conditions to effect the expansion of the polymer. The tubes after orientation and expansion will usually be substantially circular in cross-section but, depending on the shape and uniformity of cross-sectional thickness of the tubes prior to orientation and/or expansion, such tubes may be other convenient shapes commensurate with acceptable fabrication of the heat exchangers and acceptable performance of the resultant heat exchanger, especially of flow of fluid e.g. air, around the outside of the tubes. The oriented tubes should be annealed or heat set at a temperature above the expected operating temperature of the resultant heat exchanger, in order to reduce the amount of distortion of the oriented tubes during use of the heat exchanger.

The fabrication of devices having oriented and expanded tubes has been described above with reference to methods in which the tubes are oriented and subsequently expanded. However, the orientation step may be carried out in a manner that provides an oriented tube of required dimensions without utilizing an expansion step i.e. the tubes are produced in a single step. In an embodiment of such a single step method, a rod or similar object having a diameter corresponding to the diameter of the tubes that is required after orientation, but not more than about the diameter of the tubes prior to orientation, is inserted into the tubes through at least the length of the tubes that will be oriented, the rod should have a length at least equal to the length of the tubes after orientation has occurred. The tubes are then oriented, e.g. in the manner described above, in which event the tubes are oriented but retain an internal diameter corresponding to the diameter of the rod. It is preferred that the rods be heated prior to the orientation of the tubes, as such heating assists in uniform heating of the polymer of the tubes prior to orientation. After suitable cooling of the tube the rod is removed and a device that has oriented tubes of a diameter corresponding to the diameter of the inserted rod is obtained; this method may be used to provide oriented tubes of the intended final diameter without involving any step of expanding tubes that have previously been oriented.

The uniformity of the heating of the article prior to orientation may affect the orientation process, especially the quality and uniformity of the oriented product. Convection ovens may be used, but it may be preferable to use other heating methods e.g infra red heaters. The temperature of orientation of the polymer is preferably close to but below the melting point of the polymer. Subsequent to the orientation, the oriented article should be heat set or annealed e.g. by maintaining the oriented article for a period of time at a temperature just below the temperature used in the orientation process.

Figure 5:
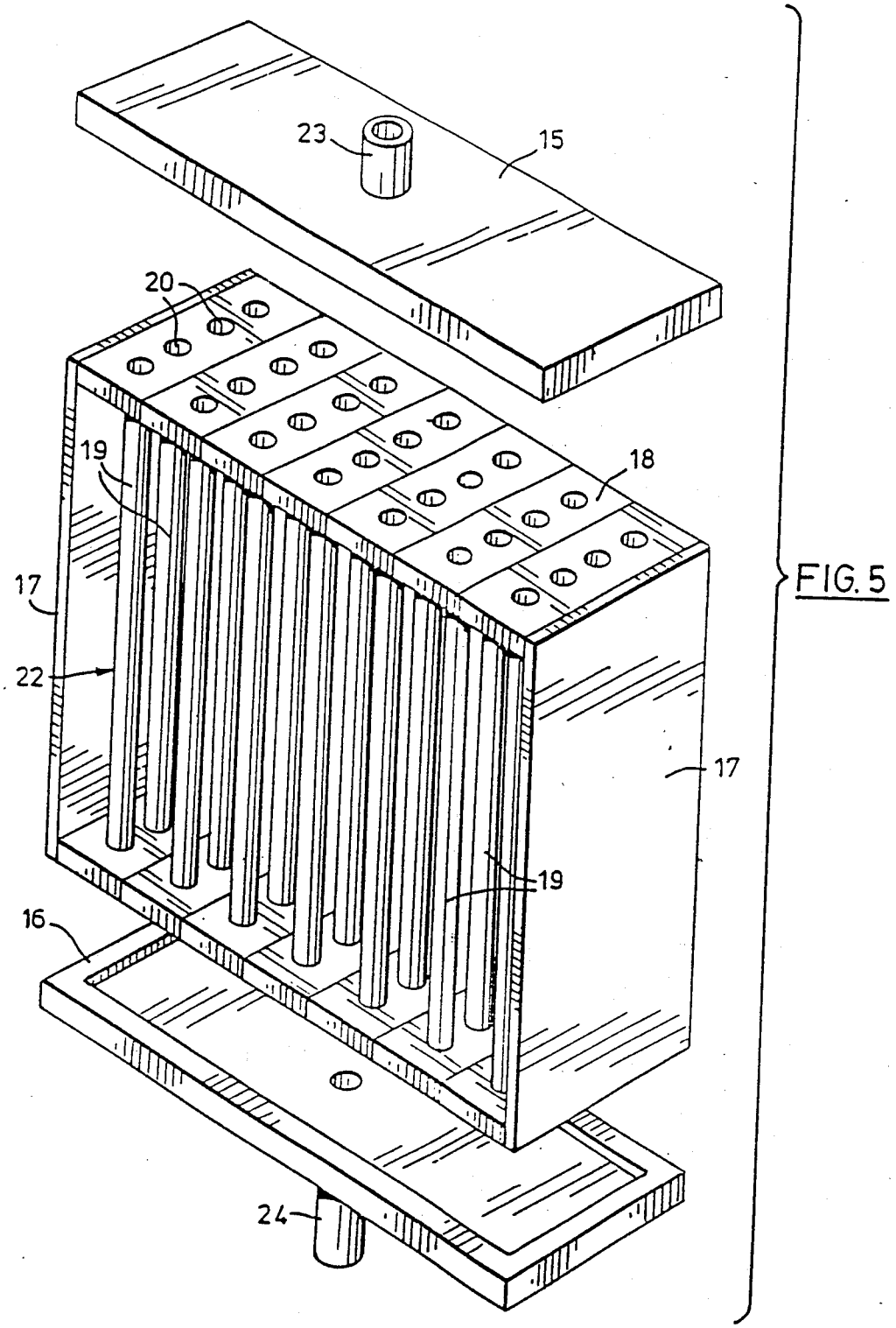
FIG. 5 is a schematic representation of a comfort heat exchanger, shown as an expanded view.

FIG. 5 shows a comfort heat exchanger 14 in expanded view. Comfort heat exchanger 14 has a first manifold 15 and a second manifold 6 that are held in spaced apart relationship by end panels 17, only one of which is actually shown. End panels 17 are of essentially the same length and width as the device of FIG. 4. A plurality of devices of FIG. 4 are located in side-by-side relationship between the two end panels 17, thereby essentially filling the space between the panels. Such devices, generally represented by 22, have end elements 18 and oriented and expanded tubes 19. Devices 22 are arranged in side-by-side relationship and are sealed together along junctions 21 in a fluid-impermeable manner. End elements 18 have a plurality of orifices 20 therein, each such orifice being in fluid-flow relationship with a tube 19. Manifolds 15 and 16 are adapted to fit over the arrangement of end elements 18 to form a fluid-tight seal. First manifold 15 is shown as having a fluid inlet 23 and second manifold 16 is shown as having a fluid outlet 24. The flow of fluid 26 runs from an inlet section of the first manifold, through tubes to a second manifold, and then to an outlet section of the second manifold. Although the fluid inlet and fluid outlet are shown on opposing manifolds, the fluid inlet and the fluid outlet may be located on the same manifold, as shown in FIG. 6, an alternative form to FIG. 5 provided that that manifold has means to direct the flow of fluid 26 from the inlet which is 25, through some of tubes 19, which contain external surface discontinuities 27 through the other manifold, through the remaining tubes 19 and to the fluid outlet.

The device of FIG. 5 is constructed in such a manner that fluid may be passed through the heat exchanger 14 without loss of fluid due to leaks or the like.

In a preferred embodiment of the heat exchanger, spacers are inserted to maintain the tubes in a desired position within the heat exchanger. Such spacers are preferably fabricated from an elastomeric material e.g a polyetherester elastomer, examples of which are available under the trademark Hytrel. One or more spacers may be placed in the heat exchanger. Examples of spacers include a sheet having holes corresponding to the size and location of the tubes; such a sheet may be slit in a number of ways to permit insertion of the spacer into the heat exchanger e.g. with parallel cuts through the holes of the sheet, starting from the same edge of the sheet or from alternating edges of the sheet, the latter producing a spacer that has a zig-zag shape prior to insertion into the heat exchanger.

In assembly of the heat exchangers of the invention, tube units with the hollow tube already oriented are bonded together in a side-by-side relationship. Such bonding may be achieved using adhesives provided that the adhesive is capable of forming strong bonds with the polymer of the heat exchanger that do not permit leakage of fluid from the heat exchanger for extended periods of time. Alternatively, the tube units may be heat sealed together using techniques similar to those used in the so-called butt welding of polymer objects. For example, hot plates may be brought into contact with the surfaces of two tube units that are to be sealed together so as to melt the surfaces. The molten surfaces are then rapidly brought into contact with each other, under pressure, and allowed to cool. Shims may be sealed between the tube units in the same manner.

It is preferred that the walls of the tubes of the heat exchanger have a thickness of less than 0.5 mm, and especially in the range of 0.12–0.4 mm. It is to be understood, however, that although tubes having thin walls are preferred, the walls must be of a thickness that will provide the physical properties required of the heat exchanger for the intended end-use. The articles and devices described herein, which are intended to be fabricated in steps for the manufacture of the heat exchangers, will have wall thickness that are proportionate to those given above, depending on the stage in the manufacture of the heat exchanger, or articles or devices thereof.

For heat exchangers in the form of comfort heat exchangers, in particular, it is preferred that the tubes of the heat exchanger have an outside diameter in the range of 2–7 mm. However, for heat exchangers intended for other end uses, tubes of smaller or greater outside diameter may be preferred.

In a preferred embodiment of the invention, the tubes have external surface discontinuities in the form of, for example, dimples, protrusions, matte or other roughened surfaces, in order to impart turbulence into fluid, especially air, flowing over the surface of the heat exchanger that is fabricated using the tubes. Similarly, internal surface discontinuities would be advantageous, as shown in FIG. 6 (27), but are difficult to fabricate into the tubes using the techniques described herein. The turbulence imparted by the discontinuities facilitates heat transfer between fluid and the material from which the heat exchanger is fabricated.

The comfort heat exchanger of the present invention is intended to be manufactured from a thermoplastic polymer or a combination e.g. blend or alloy, of thermoplastic polymers. It is to be understood, however, that the manifolds and end panels, in particular, may be manufactured from other materials. The tubed device is, however, manufactured as an integral unit from a suitable thermoplastic polymer using an injection moulding process.

The thermoplastic polymers that may be used in the manufacture of the comfort heat exchangers of the present invention will depend in particular on the conditions under which the comfort heat exchanger is to be operated. Such conditions include not only the temperatures and pressures that are to be used and the required life of the exchanger, but also the type of fluids that are to be passed through the heat exchanger and around the heat exchanger. In the example of a heater for an automobile, the fluid passed around the heat exchanger is air, whereas the fluid passed through the heat exchanger is usually liquid from the radiator of the vehicle. Such liquid is comprised of water and a so-called anti-freeze e.g. ethylene glycol, but other additives e.g. anti-rust compounds and the like, may also be present in the liquid. The polymer should also be fatigue resistant, have a low creep modulus, provide a sufficiently rigid structure, and preferably be impact resistant.

A further requirement of the thermoplastic polymer used in the manufacture of the tubular portion of the heat exchanger is that the polymer must be capable of being formed into the tubular portion as an integral unit, of having the hollow tubes thereof oriented and, in embodiments, expanded to form the tube unit that is used in the assembly of the heat exchanger.

In particularly preferred embodiments, the tubular portion of the heat exchanger is formed from a composition of a polyamide. The polyamide selected will depend primarily on the end use intended for the heat exchanger, as discussed above. In the case of use on a vehicle, the air passed through the heat exchanger may at times contain salt or other corrosive or abrasive matter.

Examples of polyamides are the polyamides formed by the condensation polymerization of an aliphatic or aromatic dicarboxylic acid having 6–12 carbon atoms with an aliphatic primary diamine having 614 12 carbon atoms. Alternatively, the polyamide may be formed by condensation polymerization of an aliphatic lactam or alpha,omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,12-dodecanedioic acid and terephthalic acid. Examples of diamines are 1,6-hexamethylenediamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid, amino undecanoic acid and amino dodecanoic acid. Preferred examples of the polyamides are polyhexamethylene adipamide and polycaprolactam, which are also known as nylon 66 and nylon 6, respectively.

As will be appreciated by those skilled in the art, the polyamides described above exhibit a wide variety of properties. For instance, meltinq points of polymers of dicarboxylic acid/diamine polymers will differ significantly from polymers of lactams or alpha,omega aminocarboxylic acids and from copolymers thereof. Similarly, other properties e.g. permeability to fluids, gases and other materials will also vary. Thus, even if the polymer selected is polyamide, a particular polyamide may have to be selected for a particular end use.

In an embodiment of the present invention, the polyamide may be a so-called amorphous polyamide. The amorphous polyamide may be used as the sole polyamide, or admixed with a polyamide of the type disclosed above. It will be appreciated by persons skilled in the art that amorphous polymers do not have glass transition temperatures, and thus such polymers should be heated to a temperature below that at which creep may be significant but sufficiently high to permit uniform orientation of the tubes.

Although the present invention has been particularly described with reference to tubes formed from compositions of polyamides, it will be appreciated that a wide variety of polymers are potentially useful in the fabrication of the tubes. The selection of such polymers will depend on a number of factors, as discussed above, especially the anticipated operating temperature of the heat exchanger, in order to obtain a heat exchanger with the properties required for operation under a particular set of operating conditions. Examples of polymers include polyethylene, polypropylene, polycarbonate, polyesters, polyphenylene oxide, polyphenylene sulphide, polyetherimide, polyetheretherketone, polyether ketone, polyimides, polyarylates and high performance engineering plastics. Such polymers may contain stabilizers, pigments, fillers and other additives known for use in polymer compositions. The nature of the polymer composition used may affect the efficiency of the heat exchanger, as it is believed that heat is capable of being dissipated from the heat exchanger by at least both convection and radiation Alloys and/or blends of polymers especially alloys and/or blends of polyamides may be used in the fabrication of the heat exchangers.

In use, it is possible that all or part of the fluid that is passed through the tubes of the heat exchanger will have a tendency to permeate through the walls of the tubes. Such permeation may result in unpleasant or other unacceptable odors being emitted from the heat exchanger and/or changes in the composition of the fluid that are unacceptable with respect to the continued operation of the heat exchanger and/or of the source of the fluid. If the anticipated rate of permeation is unacceptable, all or part of the heat exchanger, especially the tube portion of the heat exchanger may be coated with a barrier material e.g. a coating of polyvinylidene chloride. Any such coating may, for example, be applied by dip-coating the heat exchanger or by spray coating all or part of the heat exchanger but should be of a type and thickness that does not significantly adversely affect the operating effectiveness of the heat exchanger.

Heat exchangers of the present invention in the form of comfort heat exchangers are particularly intended to be used in automobiles and other vehicles. In use as a comfort heat exchanger in an automobile, the heat exchanger may have, for example, about 25-40 tubes across its width, which is typically about 20 cm. Examples of such heat exchangers are illustrated in the examples below.

The present invention is illustrated by the following examples:

EXAMPLE I

A tubular device substantially as illustrated in FIG. 1, but having 9 tubes over the length of 6.3 cm of the device, was injection moulded from polyhexamethylene adipamide. Pins were inserted into the tubes of the moulded device and then the device containing pins was placed in an even at a temperature of 244° C. for a period of 30 seconds While still in the oven, the tubes were oriented 3.2 times. The oriented device was then heat set at a temperature of 244° C. for 30 seconds and then placed in a freezer at a temperature of about −11° C. for about 5 minutes. The resultant tube diameter was 0.33–0.35 cm and the wall thickness was 0025–0.028 cm.

A series of the resultant tubular devices were welded together by heating the sides of the end elements of two tubular devices and then bringing the heated surfaces into contact under pressure. An inlet/outlet manifold was placed over one end of the welded tube elements and a second manifold was placed over the other end, so that fluid to be cooled would enter at the inlet, pass through tubes to the other manifold and then pass back through other tubes to the outlet section of the manifold. In this manner, a heat exchanger having 38 tubes across its width and 9 tubes deep, spaced over a width of 15.2 cm, a height of 21 cm and a depth of 5.0 cm was fabricated; the heat exchanger was of a type intended for use as a comfort heat exchanger in an automobile.

Tests were conducted to determine the rate of heat exchange of the comfort heat exchanger. Heated water was fed to the inlet of the heat exchanger. The temperature of the water was measured at the inlet and outlet of the heat exchanger. Air was passed through the heat exchanger, and the air pressure drop across the heat exchanger was measured. The results obtained are given in Table I.

As a comparison, the same tests were carried out on a commercial automobile comfort heat exchanger of the same dimensions and which had been fabricated from metal; the commercial metal heat exchanger weighed approximately 1.25 kg, compared with approximately 0.52 kg for the above thermoplastic heat exchanger. The results obtained are also given in Table I.

TABLE I

| Run No.* | 1 | 2 | 3 | 4 |
| --- | --- | --- | --- | --- |
| Air flow (cu. meters/min.) | 2.83 | 2.83 | 5.66 | 5.66 |
| Inlet air temp. (°C.) | 16.1 | 16.7 | 16.7 | 17.8 |
| Pressure drop (mm. water) | 12.7 | 6.35 | 61.0 | 12.7 |
| Water temp. (°C.) | | | | |
| In | 86.9 | 86.8 | 87.3 | 85.9 |
| Out | 84.6 | 84.2 | 82.1 | 81.1 |
| Heat transfer | | | | |
| (Joules/min) | 131k | 146k | 298k | 272k |
| (J/hr. °C. itd**) | 11k | 125k | 253k | 240k |

*Runs 1 and 3 were made using the heat exchanger of the invention and Runs 2 and 4 were the comparative runs.
**Joules/hour. °C. itd are units used in the automobile industry to express the heat transfer of a heat exchanger; "itd" is inlet temperature difference, defined as difference between the inlet water temperature and the inlet air temperature.

Although the pressure drop across the heat exchanger was higher for the heat exchanger of the invention, that heat exchanger gave similar or better heat exchange performance than the commercial heat exchanger.

EXAMPLE II

The procedure of Example I was repeated using heat exchangers of the invention that had the same overall dimensions as that of Example I except that there were either 28 or 31 tubes across the heat exchanger instead of 38 tubes. The tubular devices were the same as in Example I, but in the assembly of the heat exchanger shims were placed between the end elements being welded together so that the desired number of tubes across the heat exchanger was obtained. In addition, the heat exchangers had two spacers which were used to install and maintain the tubes in a uniform pattern.

The results obtained are given in Table II.

TABLE II

| Run No.* | 5 | 6 | 7 |
|---|---|---|---|
| Air flow (cu. meters/min.) | 2.83 | 4.24 | 5.66 |
| Inlet air temp. (°C.) | 20.6 | 20.6 | 20.0 |
| Pressure drop (mm. water) | 3.30 | 6.86 | 13.0 |
| Water temp. (°C.) | | | |
| In | 87.4 | 87.8 | 88.2 |
| Out | 85.2 | 85.0 | 84.3 |
| Heat transfer | | | |
| (Joules/min) | 126k | 157k | 220k |
| (J/hour. °C. itd) | 113k | 140k | 194k |
| Run No.* | 8 | 9 | 10 |
| Air flow (cu. meters/min.) | 2.83 | 4.24 | 5.66 |
| Inlet air temp. (°C.) | 18.9 | 19.4 | 18.9 |
| Pressure drop (mm. water) | 7.87 | 15.0 | 25.4 |
| Water temp. (°C.) | | | |
| In | 88.5 | 88.1 | 87.9 |
| Out | 85.7 | 84.2 | 83.2 |
| Heat transfer | | | |
| (Joules/min) | 157k | 220k | 267k |
| (J/hour. °C. itd) | 135k | 192k | 232k |
| Run No.* | 11 | 12 | 13 |
| Air flow (cu. meters/min.) | 2.83 | 4.24 | 5.66 |
| Inlet air temp. (°C.) | 20.6 | 20.6 | 20.6 |
| Pressure drop (mm. water) | 6.09 | 9.91 | 15.7 |
| Water temp. (°C.) | | | |
| In | 87.7 | 88.4 | 87.9 |
| Out | 83.5 | 83.2 | 80.9 |
| Heat transfer | | | |
| (Joules/min) | 235k | 298k | 397k |
| (J/hour. °C. itd) | 210k | 264k | 354k |

*Runs 5, 6 and 7 were made using the heat exchanger of the invention having 28 tubes.
*Runs 8, 9 and 10 were made using the heat exchanger of the invention having 31 tubes.
*Runs 11, 12 and 13 were comparative runs, using the metal heat exchanger.

The lower number of tubes significantly reduced the effectiveness of the heat exchangers of the invention. Examples I and II show that a significant variation in efficiency is achievable by changes in design of the heat exchangers.

EXAMPLE III

In an alternate embodiment, tubular devices injection moulded from polyhexamethylene adipamide have been subjected to an orientation process in the presence of infra red heaters instead of an oven. Pins were inserted into the tubes and the pins were then heated for a period of time. The tubular devices containing the heated pins were then placed between infrared heaters for a further period of time, after which the tubes were oriented. The resultant oriented devices were then heat set, cooled to ambient temperature and placed in a freezer for a further period of time.

Further details of experimental conditions that have been used are given in Table III.

TABLE III

| Pin diameter (mm) | 3.00 | 2.75 | 2.50 | 2.00 |
|---|---|---|---|---|
| Pin heating time (sec) | 90 | 70 | 50 | 50 |
| Tube heating time (sec) | 100 | 70 | 30 | 18 |
| Tube temperature* (°C.) | 182 | 182 | 153 | 153 |

*The tube heating temperature was measured by a thermocouple placed adjacent to the tubes being heated.

The oriented tubular devices were heat set at 208° C. for 45 seconds, placed in air at 22° C. for 50 seconds and then in a freezer at −11° C. for 5 minutes.

This procedure has been found to offer some advantages with respect to decreased amounts of distortion obtained in the oriented tubular devices that are obtained.

We claim:

1. A device manufactured from a thermoplastic polymer, said device essentially comprising a plurality of transverse parallel hollow tubes integrally connected by a radiused and flared integral junction at each end to a substantially rigid end element, each of said end elements having planar sides and opposing faces, the tubes being internally connected to one face of each end element, said end elements having orifices therein extending between said opposite faces and being in fluid flow communication with said hollow tubes, and the hollow tubes having been oriented to increase the length thereof by at least two times and to obtain an internal diameter of at least 0.5 times that of the tubes prior to orientation, the walls of said tubes between the integral junctions being of substantially uniform thickness.

2. The device of claim 1 in which the hollow tubes have been oriented to increase the length thereof by at least two inches and then expanded so that the internal diameter of said tubes is at least 0.5 times the diameter of the tubes prior to orientation.

3. The device of claim 1 in which the thermoplastic polymer is a polyamide.

4. The device of claim 3 in which the polyamide is polyhexamethylene adipamide.

5. The device of claim 3 in which there are 4–10 tubes.

6. A heat exchanger comprising:
    (a) two manifold elements, said manifold elements being adapted to receive and discharge a fluid, and
    (b) a plurality of tube units transversely located between said manifolds, each said tube units being formed from thermoplastic polymer and essentially comprising a plurality of transverse parallel hollow tubes integrally connected by an integral junction at each end to a substantially rigid end element, each of said end elements having planar sides and opposing faces, the tubes being integrally connected to one face of each end element, each of said tubes being radiused at the integral junction of tube and end element, said end elements having orifices therein extending between said opposite faces and being in fluid flow communication with said hollow tubes, the hollow tubes having been oriented to increase the length thereof by at least two times, the walls of said tubes between the integral junctions being of substantially uniform thickness, said tube units being positioned so that the hollow tubes are in a spaced apart but juxtaposed relationship, said tubes units being sealed together so that fluid will flow from one manifold to the other manifold through the hollow tubes.

7. The heat exchanger of claim 6 in which the integral junctions are radiused and flared.

8. The heat exchanger of claim 7 in which the internal diameter of the oriented tubes is at least 0.5 times that of the tubes prior to orientation.

9. The heat exchanger of claim 7 in which the hollow tubes have been oriented to increase the length thereof by at least two times and then expanded so that the internal diameter of said tubes is at least 0.5 times the diameter of the tubes prior to orientation.

10. The heat exchanger of claim 7 in which the thermoplastic polymer is a polyamide.

11. The heat exchanger of claim 10 in which the polyamide is polyhexamethylene adipamide.

12. The heat exchanger of claim 10 in which there are 4–10 tubes in each tube unit.

13. The heat exchanger of claim 12 in which there are 25–40 tube units.

14. The heat exchanger of claim 10 in which the thickness of the walls of said tubes is less than 0.5 mm.

15. The heat exchanger of claim 14 in which the thickness is in the range of 0.12–0.4 mm.

16. The heat exchanger of claim 15 in which the outside diameter of the tubes is in the range of 2–7 mm.

17. The heat exchanger of claim 10 in which the heat exchanger is adapted so that fluid will flow from an inlet section of a first manifold, through tubes to a second manifold, and then back through further tubes to an outlet section of the first manifold.

18. The heat exchanger of claim 10 in which the tubes have external surface discontinuities.

* * * * *